US010803180B2

(12) United States Patent
Shukla (10) Patent No.: US 10,803,180 B2
(45) Date of Patent: Oct. 13, 2020

(54) DETERMINISTIC METHOD FOR DETECTING AND BLOCKING OF EXPLOITS ON INTERPRETED CODE (71) Applicant: Jayant Shukla, Sierra Madre, CA (US)

(72) Inventor: Jayant Shukla, Sierra Madre, CA (US)

(*) Notice: Subject to any disclaimer, the term of this patent is extended or adjusted under 35 U.S.C. 154(b) by 270 days.

(21) Appl. No.: 15/840,996

(22) Filed: Dec. 13, 2017

(65) Prior Publication Data

US 2019/0180036 A1 Jun. 13, 2019

(51) Int. Cl.
| H04L 29/06 | (2006.01) |
| G06F 21/57 | (2013.01) |
| G06F 9/445 | (2018.01) |
| G06F 9/54 | (2006.01) |
| G06F 11/36 | (2006.01) |
| G06F 21/53 | (2013.01) |
| G06F 9/455 | (2018.01) |

(52) U.S. Cl.
CPC ........ *G06F 21/577* (2013.01); *G06F 9/44589* (2013.01); *G06F 9/45529* (2013.01); *G06F 9/54* (2013.01); *G06F 11/3604* (2013.01); *G06F 21/53* (2013.01)

(58) Field of Classification Search
None
See application file for complete search history.

(56) References Cited

U.S. PATENT DOCUMENTS

| 7,127,713 | B2* | 10/2006 | Davis ................. H04L 63/0227 717/177 |
| 8,849,985 | B1* | 9/2014 | Colton ................ G06F 9/45529 709/203 |
| 8,935,789 | B2* | 1/2015 | Shukla ................ G06F 21/568 713/164 |
| 9,798,524 | B1* | 10/2017 | Colton ................... G06F 9/541 |
| 2008/0016339 | A1* | 1/2008 | Shukla ................... G06F 21/53 713/164 |
| 2010/0031361 | A1* | 2/2010 | Shukla ................ G06F 21/567 726/24 |
| 2013/0160131 | A1* | 6/2013 | Madou ................ G06F 21/577 726/25 |
| 2014/0237594 | A1* | 8/2014 | Thakadu ............... G06F 21/52 726/23 |
| 2014/0298469 | A1* | 10/2014 | Marion ................. G06F 21/55 726/23 |
| 2016/0337400 | A1* | 11/2016 | Gupta ................ G06F 21/6218 |
| 2019/0180036 | A1* | 6/2019 | Shukla ................... G06F 21/53 |
| 2019/0243964 | A1* | 8/2019 | Shukla ................... G06F 21/54 |

* cited by examiner

Primary Examiner — Jeffrey L Williams (57) ABSTRACT

In one aspect, a method useful for preventing exploitation of a vulnerability in an interpreted code by monitoring and validating an execution of the interpreted code in a script file by an application server, includes the step of generating a mapping for an incoming network connection to a specified script file to be executed by an application server. The computerized method includes the step of inserting a hook for monitoring an application programming interface (API) call or a privileged instruction executed by the application server. The computerized method includes the step of inserting a validation code configured to validate the API call or the privileged instruction executed by the interpreted code in a script.

9 Claims, 9 Drawing Sheets

DETERMINISTIC METHOD FOR DETECTING AND BLOCKING OF EXPLOITS ON INTERPRETED CODE

BACKGROUND

Vulnerabilities in executable code can be exploited to launch attacks and gain unauthorized access. Buffer overflow vulnerabilities, for example, are relatively easy to introduce and have been a common attack vector for many years. Over time, advancements have been made that mitigate inadvertent vulnerabilities in binary executable code. The use of the No-eXecute (NX) bit on memory pages to prevent execution of unauthorized code, stack canaries, control flow integrity, etc., are all various methods that have been introduced over the years that can block a significant number of attacks based on executable binary vulnerabilities.

While the traditional client-server applications of the past were built on compiled code, modern web applications are built using interpreted languages. That is, instead of converting an application program file into machine code prior to execution (compiling), these newer applications use an interpreter to parse and execute human-readable code at runtime. No executable machine code need ever be produced. Interpreted code has become popular due to the comparative simplicity and speed of its development. The drawback of using interpreted code had been the potential performance hit, as several steps can be performed in order to execute it. In comparison, binary code could be executed directly on the operating system and incurred significantly lower overhead. Over time, though, interpreter optimization has led to significant improvement in the performance of interpreted code, and now most web applications are developed using interpreted languages.

While buffer overflow-induced vulnerabilities were the main concern of compiled applications, new security challenges emerge when dealing with interpreted code. For one, the interpreter can incorrectly interpret the data supplied by the user and execute undesired instructions. For example, in PHP (PHP: Hypertext Preprocessor, a popular open-source scripting language), the eval( ) function is used to evaluate PHP code strings, and unserialize( ) is used to convert user-supplied variables into PHP values. Since these same functions can also lead to execution of system commands, by carefully crafting the input data to the interpreted code, an attacker can steer the interpreter to execute commands on the device that would lead to a compromise. This vulnerability of the unserialize( ) function has, in fact, been used to execute PHP object injection attacks. Similarly, the JSON (JavaScript Object Notation) parser for the Ruby on Rails web-application framework was found to be vulnerable to injection of malicious objects.

Several solutions have been proposed to detect attacks on web applications. The most common approach is to use a web-application firewall to block attacks by sanitizing the malicious input that attackers supply to applications to trigger their vulnerabilities. There are, however, several drawbacks of using such a firewall for improving the security of web applications. First, these firewalls are complex. In order to perform effective sanitization, the firewall can have insight into the nature of all application variables. Second, firewalls are always playing catch-up; their effectiveness relies on the proper heuristics already having been developed from knowledge of past attacks. Third, they do not work well out of the box, but can be led through a training period to improve their sanitization ability. Fourth, they can be a drag on performance. As its heuristics and definition database sizes increase, a firewall can easily become a bottleneck that leads to latency and scalability issues.

Another approach is runtime application self protection (RASP) where application or scripts are instrumented to enforce security checks for defending against exploits. The instrumentation of script file invariable results in degraded performance as well as increase in the attack surface. Instrumentation of the application incurs significant overhead as the security code has to be merged with the build process for the application. If a third-party application Is used then building a version with security instrumentation in place may not be feasible.

Therefore, a need exists for systems and methods to protect computer systems from attacks that exploit vulnerabilities in interpreted code. The solution may not take away or limit the capabilities of the software in a manner that could interfere with proper execution of the code. It is also desirable that the solution not rely too much on heuristics or past information, as doing so imposes fundamental limitations on the efficiency and scalability of the solution. Finally, the security mechanism should work seamlessly and without any input from the user. A deterministic method that requires neither any prior knowledge about potential attacks nor any assumptions about the vulnerabilities in the interpreted code will be more effective compared to methods that rely on analytics and a priori approaches.

SUMMARY

In one aspect, a method useful for preventing exploitation of a vulnerability in an interpreted code by monitoring and validating an execution of the interpreted code in a script file by an application server, includes the step of generating a mapping for an incoming network connection to a specified script file to be executed by an application server. The computerized method includes the step of inserting a hook for monitoring an application programming interface (API) call or a privileged instruction executed by the application server. The computerized method includes the step of inserting a validation code configured to validate the API call or the privileged instruction executed by the interpreted code in a script. The validation code matches the API call or the privileged instruction against a rule set for the script. The computerized method includes the step of loading the rule set. The rule set specifies a type of API call or a type of privileged instruction. The rule set specified a location of the API call or the privileged instruction in the interpreted code; capturing an event. The event indicates a start and an end of an execution of the interpreted code. An application server thread manages the event; obtaining an execution event of the API call or the privileged instruction that correspond to a specific script files by filtering the event collected from the application server. The computerized method includes the step of checking, with a validation code, a conformity of the execution event of the API call or the privileged instruction with the rule set for the script as determined by the mapping. The computerized method includes the step of detecting a rule violation; and obtaining, with the validation code, a default action for the execution event of the API call or the privileged instruction during the execution of the interpreted code.

BRIEF DESCRIPTION OF THE DRAWINGS

The Figures described above are a representative set, and are not an exhaustive with respect to embodying the invention.

DESCRIPTION

Disclosed are a system, method, and article of manufacture for detecting and blocking of exploits on interpreted code. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Application programming interface (API) is a set of subroutine definitions, protocols, and tools for building application software. An API call can include system calls and API calls to library functions. System calls are special class of API calls that wrap privileged instructions.

Dynamic linked library (DLL) refers to a program module providing a set of API calls. The use of DLLs helps modularize programs and often used in providing interface to the operating system.

Dynamic analysis refers to execution of an application in a sandboxed environment to observe, record, and analyze its actions.

Event is information collected about the state of the process including register values, application stack, application process map, and application file attributes.

Hypervisor can be computer software, firmware or hardware that creates and runs virtual machines.

Hooking refers to a range of techniques used to alter or augment the behavior of an operating system, of applications, or of other software components by intercepting function calls or messages or events passed between software components. A software hook can be a set of code that handles such intercepted function calls, events or messages.

No-eXecute (NX) is a technology used in CPUs to segregate areas of memory for use by either storage of processor instructions (code) or for storage of data, a feature normally only found in Harvard architecture processors.

Seccomp (secure computing mode) is a computer security facility in the LINUX kernel.

Whitelist can be a list or register of entities that provide a particular privilege, service, mobility, access or recognition. Entities on the list can be accepted, approved and/or recognized.

Zero-day vulnerability can refer to a computer-software vulnerability that is unknown to those (including the vendor of the target software) who would be interested in mitigating the vulnerability.

Exemplary Systems and Methods

In one example embodiment, a method and system are provided for a deterministic technique that prevents unauthorized API calls by interpreted code by isolating characteristics of individual files and generating rules specific to them to improve defensive capabilities. It is noted that an insight that an attack that exploits vulnerabilities arising in the execution of interpreted code can be successful if the attacker is able to execute privileged instructions, system calls, and API calls, collectively referred to as API calls from here on. If a vulnerability in the interpreted code is being exploited, then by definition, the API call execution pattern will change. The methods and systems herein can detect and block an attack by vetting actual API calls against those predicted by analysis of the application.

In one embodiment, interpreted code in a script file is scanned for API calls. A list of API calls and their locations in the script file is created. Software hooks are placed for monitoring API calls during execution of the interpreted code. Connections to the web server are monitored. HTTP requests are mapped to the interpreted code file. Execution of the script file containing interpreted code is monitored. Association is made between observed API calls and the interpreted code. During the execution of the interpreted code the observed API calls are validated against the whitelist of API calls for that interpreted code file. Prescribed action is taken if the observed API call is not in accordance with the list. An event is logged.

In a second embodiment of the invention, the execution of interpreted code is monitored to generate the rule list. Software hooks are placed for monitoring API calls during interpreted code execution. During the execution of the interpreted code the type and location of API calls are recorded. A rule list is generated.

A third embodiment of the invention concerns secondary validation that resolves ambiguities and flag true attack events. To perform the secondary test, upon receipt of an event, the corresponding interpreted code file is scanned. A list of all instructions is generated. A list of all API calls is generated. The received event is matched with the interpreted code at the locations that are consistent with known instructions and API calls. If the type of API call is not consistent with the information extracted from the interpreted code, the event is deemed invalid. If the event is an API call (i.e. not another kind of privileged instruction), two additional checks are made.

In a fourth embodiment, a computer system is scanned for web applications, script files associated with the web application are detected. Script files are analyzed for API calls. Aa rule list is generated for each script file. Web application execution is monitored. Association between web requests and script files is made. Execution of script file is detected. Observed API calls are matched against the known rule list for the given web request. The rule list contains the list of API calls and their precise location in the script file.

Authentication of API calls executed by interpreted code for preventing cyber-attacks can be deterministic and does not rely on the user to configure any rules or heuristics. It can also provide the ability to detect and block cyber-attacks before any harmful malicious instructions are executed. The task of generating a list of rules for controlling the API calls executed by interpreted code can be simple and deterministic. It can be automated much more efficiently compared to the task of generating a list of attack signatures.

In one embodiments, the insight that an attack that exploits vulnerabilities arising in the execution of interpreted code can be successful if the attacker is able to execute privileged instructions, system calls, and API calls, collectively referred to as API calls from here on, as above. Some examples of API calls, though these are not exhaustive, are write( ), read( ), open( ), and fork( ). During the execution of an interpreted code file, API calls are monitored and validated by means of a rule list. If a vulnerability in the interpreted code is being exploited, then by definition, the API call execution pattern will change, and the method can detect the attack.

In one embodiment, authentication of interpreted code execution is accomplished by observing its action from a more highly privileged process. No modifications to the interpreted code being protected are necessary. In another embodiment, authentication of the interpreted code execution is accomplished via dynamic or static instrumentation of the code executing in the memory of the client computing device.

In one example, a deterministic method can be used to achieve very precise regulation of API calls. The method can use information about the internal structure of each interpreted code file to create deterministic rules, and then enforce them for a specific file during the execution of the code. The method can associate API calls to specific files to reduce the attack surface without adversely impacting the functionality of the application server in any manner. The methods can monitor and mediate API calls from a remote location.

A seccomp security feature of the LINUX kernel can be used to implement white-listing and black-listing solutions for compiled code by providing a native mechanism to restrict system API calls by type for any given application. Seccomp-like capabilities can be extended to individual script files, so they can be secured against vulnerabilities. Additionally, methods and systems can detect and block almost every category of zero-day exploit without relying on signatures of past attacks. Further, various embodiments may not require modification of the interpreted code.

Figure 1:
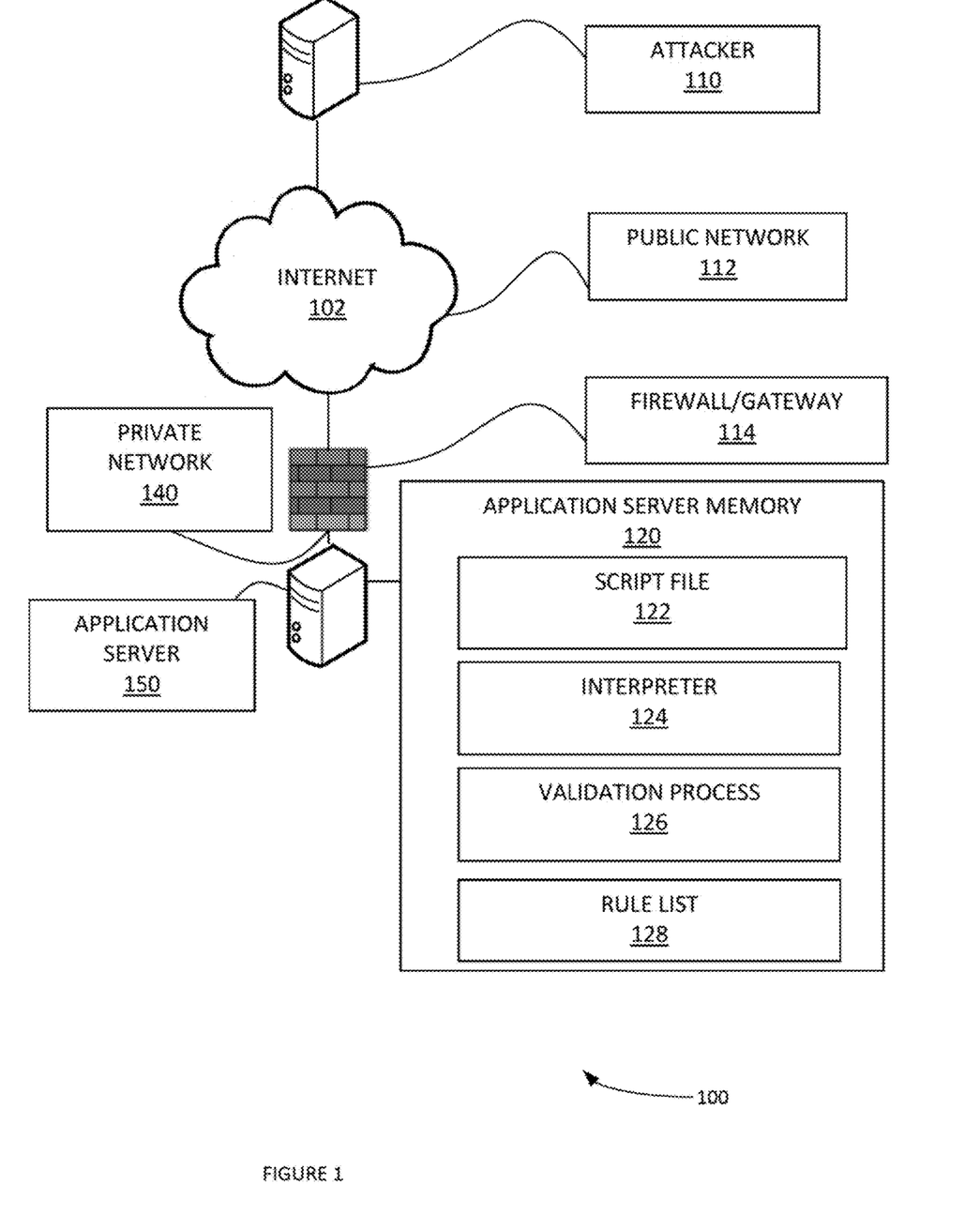
FIG. 1 illustrates a block diagram of a computer network, according to some embodiments.

FIG. 1 illustrates a block diagram of a computer network system 100, according to some embodiments. One or more networked application servers 150 can be accessed through public network 112 and/or private network 140. Any one of the computers can be an attacker 110, and its identity and intentions may not be known. Public network 112 (e.g. between the application servers) can include a range of components such as routers, switches, firewalls, content filters, proxies and other hardware that route the data transmitted between the application servers 150. The network between the application servers can be public network 112 or private network 140 and/or a combination thereof. Application server(s) 150 can be computing devices such as, inter alia: a personal computer, a notebook computer, a workstation, server, a smart phone, or the like. While the FIG. 1 depicts only one application server, one attacker, and one policy server, other embodiments of the computer network system may contain multiple instances of each.

For the embodiment illustrated in FIG. 1, system 100 can include an application server(s) 150 that executes a set of script files 122. Application server(s) 150 can include application server memory 120. Script files 122 can include vulnerabilities that may be targeted and exploited by attacker 110. Script files 122 may contain code that is interpreted and executed at run time by interpreter 124 in the application server(s) 150. In application server memory 120 of an application server 150 a validation process 126 can be executed. Validation process 126 can detect and prevent attempts to exploit vulnerabilities in the interpreted code executing on the application server 150 by monitoring and validating API calls executed by said interpreted code in the script file 122. The validation process can be implemented as a service, application, DLL (dynamic-link library), kernel module, or hypervisor. Validation process 126 can monitor a set of interpreted code in the script file(s) 122 executing in the application server memory 120 of a client. Validation process 126 can apply monitoring to a code being executed. Validation process 126 can monitor API calls. Validation process 126 can validate API calls using a rule list 128 for each set of code. Validation process 126 can take a specified default action when a violation is detected.

Figure 2:
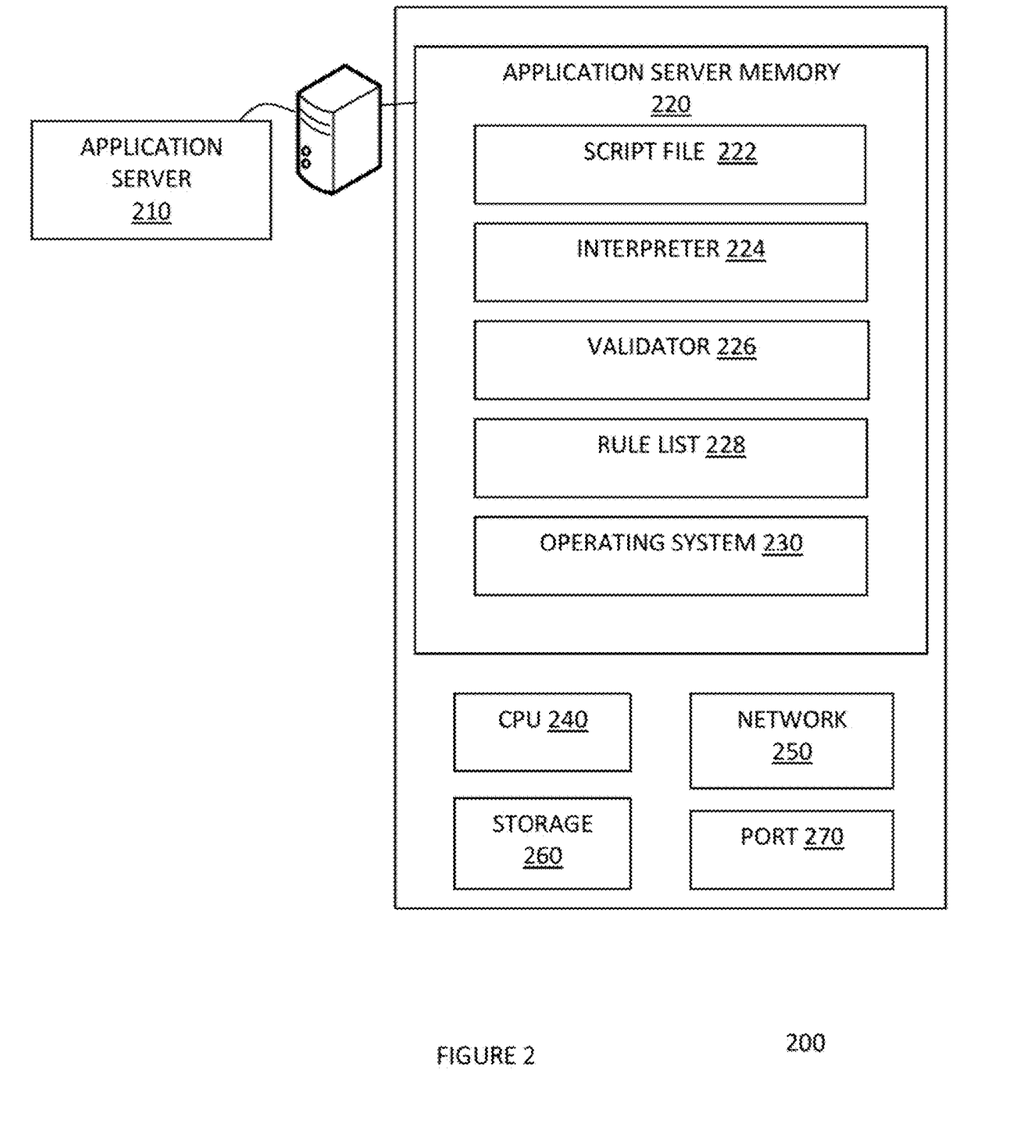
FIG. 2 provides an example system that can be used to implement various example embodiments.

FIG. 2 provides an example system 200 that can be used to implement various example embodiments. In one example, the monitoring, rule generation, and validation steps can be applied at the same computing device. System 200 includes an application server 210. Application server 210 can execute a set of script files 222. Script files 222 can include interpreted code. In memory 220, application server 210 can execute a validation process 226. Validator process 226 can monitor API calls executed by interpreted code and enforce rules. The execution of the interpreted code can be implemented by interpreter 224. The validation of the observed API calls made by the interpreted code can be implemented by validator process 226. Validator process 226 can be implemented as an application, kernel module, hypervisor, or a DLL. Validator process 226 can monitor the set of scripts executing in the application server memory 220; API calls are monitored; collected events are validated; and rule list 228 is generated. Using the rule list, application 222 is protected against attacks attempting to exploit vulnerabilities in the code. In accordance with one aspect of the present embodiment the monitoring, validation, and enforcement of API calls made by the interpreted code in script files can all be part of a validator process 226. In one example, monitoring, validation, and enforcement of API calls can be made by the interpreted code in script files can be separate processes. In one example, the observed API calls executed by the interpreted code in script file 222 at the computing device 150 are reported to the rule server 160, where the rule set is applied to detect violations.

Application server 210 can incorporate additional components including, inter alia: central processing units (CPU) 240, storage devices 260, network devices 250, and input/output ports 270. While application server 210 illustrated here has been illustrated with a single CPU, storage device, network device, and input/output port, some embodiments can be implemented in many different configurations of the computing system and incorporate more than one of the individual components. Application server 210 can, further, include operating system 230, read-only memory (ROM), compact disk ROM (CD-ROM), random-access memory (RAM), erasable programmable read-only memory (EPROM), storage area network (SAN), or other storage media that can be accessed by application server 210.

Figure 3:
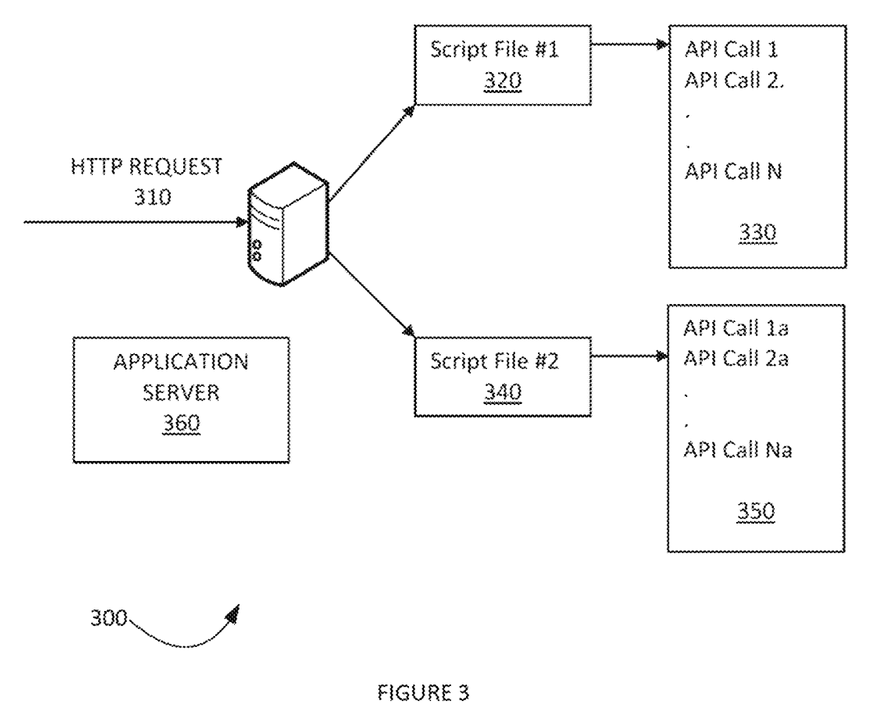
FIG. 3 illustrates the processing of an incoming network connection to the web application server which leads to execution of interpreted code in the scripts, according to some embodiments.

FIG. 3 illustrates the processing 300 of an incoming network connection 310 to web application server 360 which leads to execution of interpreted code in the scripts 320 340, according to some embodiments. An incoming HTTP request 310 connection to web-application server 360 can be mapped to its respective script files 320 340. The execution of script files 320 340 results in API calls 330 350. Normal execution of a script file will result in a specific API call list pattern. When a vulnerability in the code of the script files 320 340 is exploited, however, the pattern of the API calls executed by the scripts 320 340 may change. By detecting this change, the exploitation of vulnerabilities in the script files can be prevented. Enforcing API calls by individual script file offers an improvement in detecting attacks over monitoring the overall behavior of the application server, where the combined activity of multiple scripts can easily overlap with actions that might be taken by the attacker.

Figure 4:
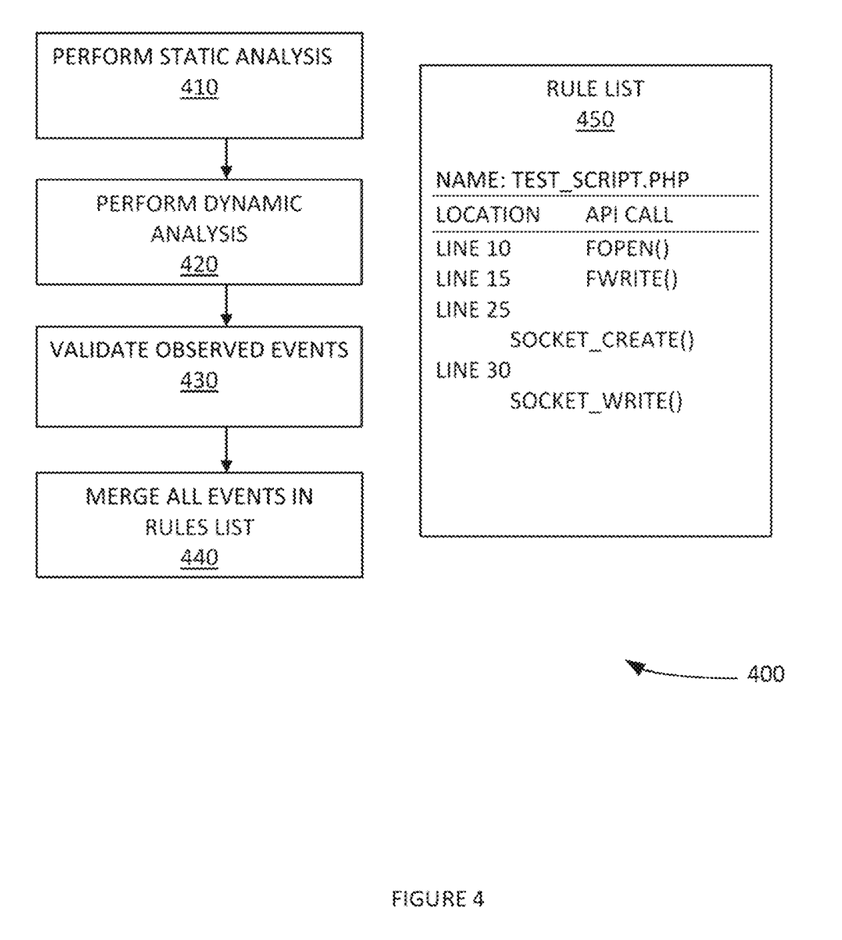
FIG. 4 illustrates an example process for the generation of rules used in the validation of API calls made by the individual script files, according to some embodiments.

FIG. 4 illustrates an example process 400 for the generation of rules used in the validation of API calls made by the individual script files, according to some embodiments. The interpreted code can be statically analyzed in step 410 to generate a list of the potential API calls that may be made. This list can be obtained through lexical analysis of both the original text of the interpreted code and its generated byte code. Dynamic analysis is performed in step 420 on the interpreted code of the script file by executing it in a controlled environment and recording the API calls made. All observed event' (e.g. an API call, etc.) can be validated in step 430 by examining the code contained in the script file to ensure that the calls are consistent with the structure of the interpreted code. As an example, consistency can be checked by using knowledge about the API call and its arguments. How the arguments used by the API call are loaded into the registers serves as partial validation; the check can be further enhanced by validating the type of each argument. Once detected API calls in the interpreted code have been validated, the validated API calls are merged in step 440 and a rule list 450 is created specifying the types and locations of the calls. The generated rule list 450 can be transmitted to the enforcement point where it is used to permit or deny API calls.

Figure 5:
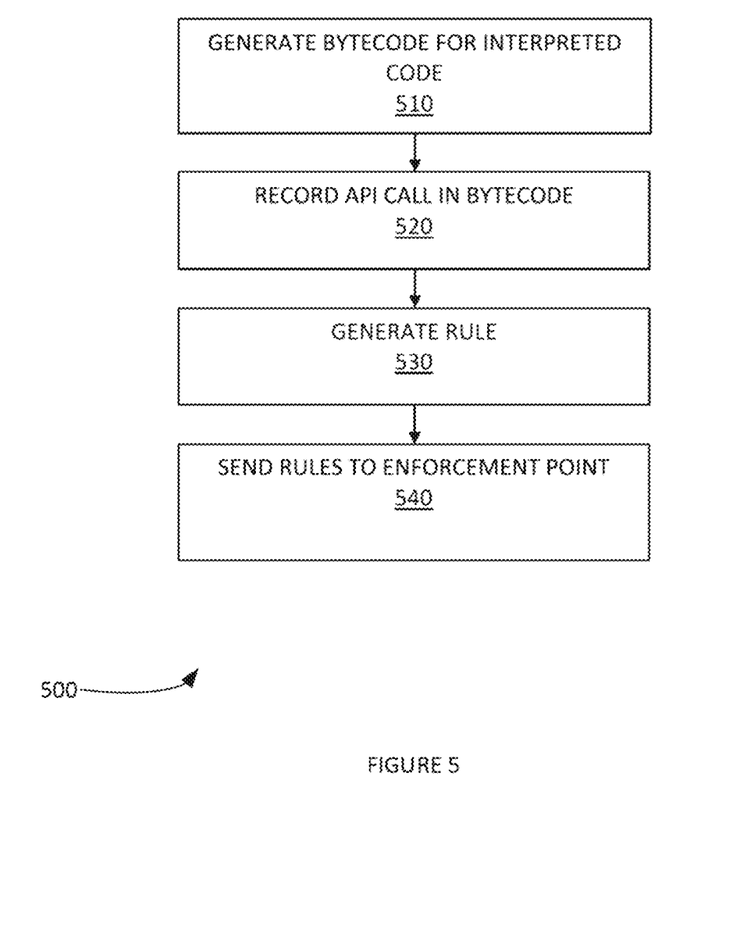
FIG. 5 illustrates an example process for static analysis of interpreted code in script files and the generation of a rule set, according to some embodiments.

FIG. 5 illustrates an example process 500 for static analysis of interpreted code in script files and the generation of a rule set, according to some embodiments. Static analysis methods can scan human-readable code to detect problematic actions and/or vulnerabilities. With their reliance on semantics, these approaches can make errors due to variations in the representation of API calls and because of purposeful code obfuscation. In order to overcome these problems, the interpreted code is first converted into bytecode in step 510. The bytecode can be executable by an interpreter. The generated bytecode is then scanned for API calls, dramatically reducing missed detections. The type and location of the API calls in the bytecode is recorded in step 520. The observed API calls are validated. The rules are generated in step 530. In step 540, the rules are sent to an enforcement point.

Figure 6:
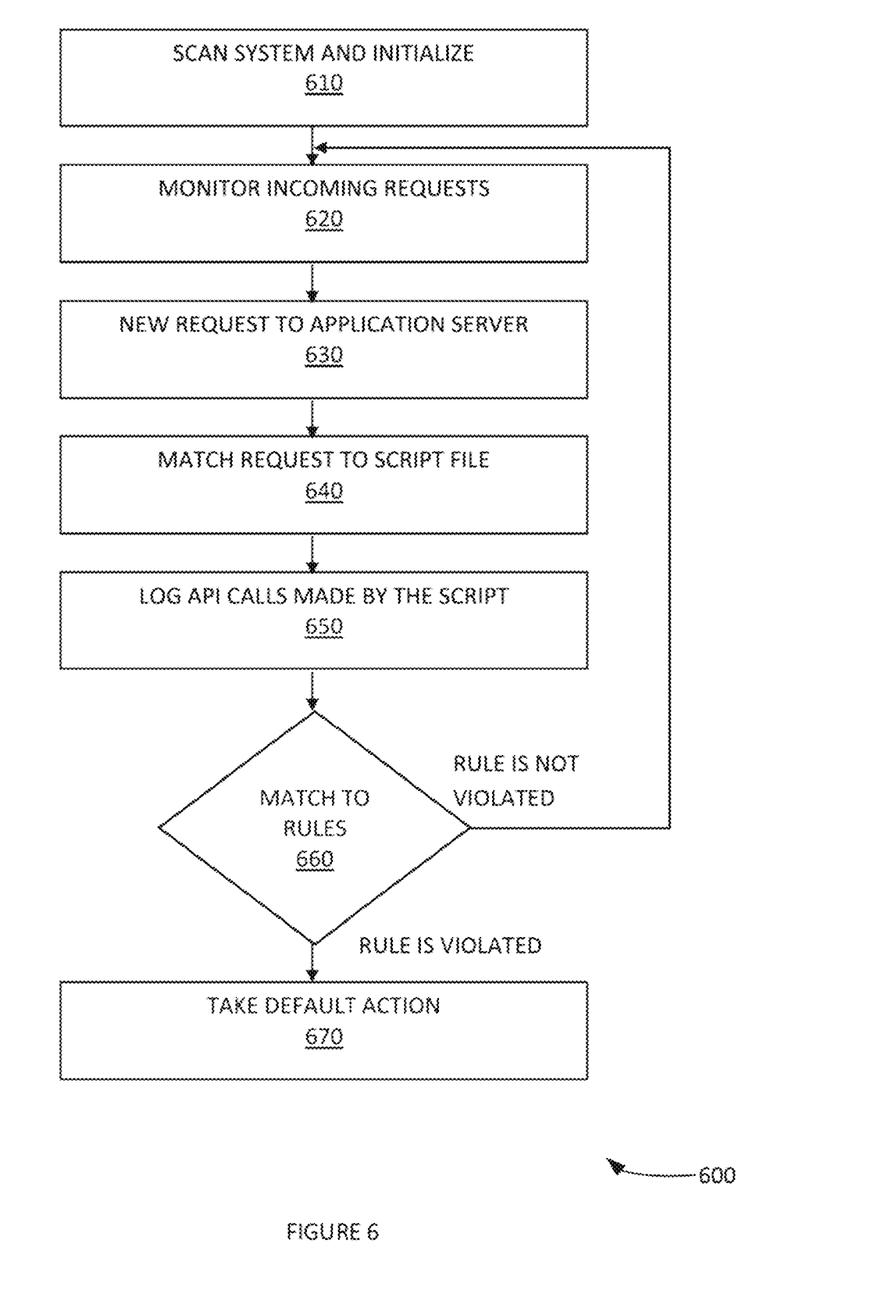
FIG. 6 illustrates a validation process used to permit or deny API calls executed by interpreted code in a script file that is consistent with one embodiment of the present invention, according to some embodiments.

FIG. 6 illustrates a validation process 600 used to permit or deny API calls executed by interpreted code in a script file, according to some embodiments. In order to perform validation, process 600 can correctly associate an incoming request with the script file whose execution it triggers. The system is scanned and initialized in step 610 to locate script files and mappings that match network connections to script files. As part of the initialization process, monitoring and validation hooks are placed that may be either system-wide or specific to each script. A rule list for each script file is loaded. Start and end of the execution of a script file is monitored. When an API call is executed by the interpreted code in the script file, the validation process uses the rule list for that process to determine if the API call can be permitted. In some instances, the API calls may be executed by another application, e.g., by a common gateway interface (CGI) server. In those cases, the approach remains identical, but the validation mechanism is applied to the CGI application thread processing the API call.

A mechanism that detects execution of a specific script is installed. An example of such a mechanism is the monitoring of incoming network connections in step 620 to detect the serving of a new HTTP request by a web server. The mapping between the incoming request is obtained in step 630 from the configuration of the application server. The incoming request is matched with a corresponding script file is obtained in step 640. It is noted that that the start and end of execution of all script files is monitored.

For example, in an APACHE web server, from the .htaccess (e.g. hypertext access) configuration file, which prescribes script files for handling incoming web requests. The system is monitored to obtain the identity of the process or worker thread responsible for processing the incoming HTTP request.

In step 650, API calls made by the script are logged. API calls made by the process or the worker thread are monitored. All the API calls made by that process or worker thread until the completion of that HTTP request can be assigned to the same script file. The API calls made by the script file are updated by the validation server and loaded into the memory of the validation process. The script files are identified based on their hashes. The observed API calls are matched against the rule set for the script file in step 660. If a rule is violated, an event is logged, and default action is performed in step 670. Otherwise the program continues its normal execution and continues monitoring new requests and process 600 returns to step 620.

The event is reported to the rule server. The rule server then further analyzes the event to determine if the event represents a real attack or an incompleteness of the rule list for that script. When the cause for the event is an incomplete rule set, an update can be sent to the application server. In case the event has resulted from a potential attack, the rule server may send instructions that include, but are not limited to, stopping the execution of the script and terminating the network connection responsible for the event. The code for validation of API calls can also be used in monitoring mode to generate a rule list. In monitoring mode, upon encountering an API call, an event is merely logged and then code execution is allowed to proceed.

Figure 7:
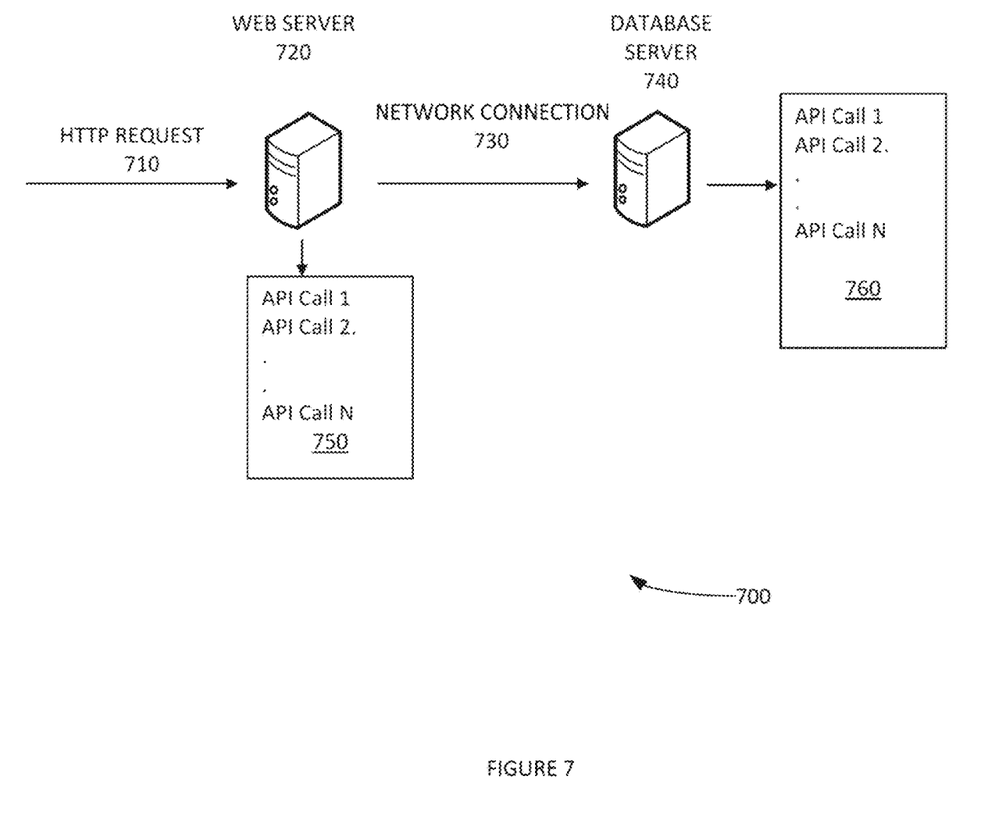
FIG. 7 illustrates an example process of an HTTP request to a web server that results in execution of several API calls, according to some embodiments.

A common scenario in web applications is for the application server to act as a proxy and send API calls to be executed at another application server, as for example, when database API calls are sent by the web server to the database server. In this case the above method is not sufficient. FIG. 7 illustrates an example process 700 of an HTTP request 710 to a web server 720 that results in execution of several API calls 750, according to some embodiments. Web server 720 sends instructions over a network connection 730 to another application server 740 where additional API calls are executed in step 760. The rule list for API call execution can be extended to incorporate any actions another application server needs to execute on behalf of the application server.

While various enforcement techniques can be used, to example method of process 700 are now discussed. In one example of possible actions of a script file, incorporation that enumerates actions on a per-script file basis can be implemented. For example, web application server 720 can monitor network connection 730 to another application server and scans the data for API call commands being transmitted. API call commands that are detected can be validated using the rule list for the script associated with network connection 710 to application server 720. In another example, the enforcement can be implemented at remote database server 740. A rule list can be transmitted to the remote database server 740 from the application server 720. The remote database server 740 determines the local thread responsible for executing the API call commands received from the application server and enforces the received rules.

Figure 8:
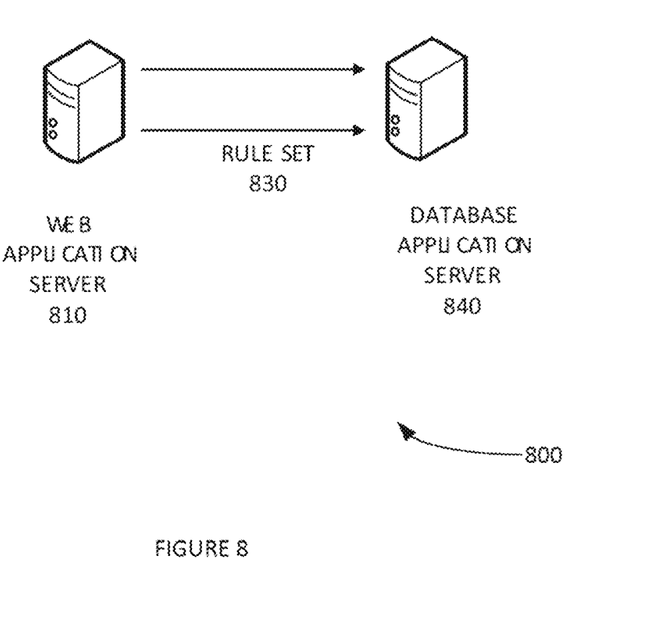
FIG. 8 illustrates an embodiment of a rule list transmitted from the web application server to the database application server to enforce API call enforcement for commands received over a network connection, according to some embodiments.

FIG. 8 illustrates an embodiment 800 of a rule list 830 transmitted from the web application server 810 to the database application server 840 to enforce API call enforcement for commands received over a network connection 820, according to some embodiments.

Figure 9:
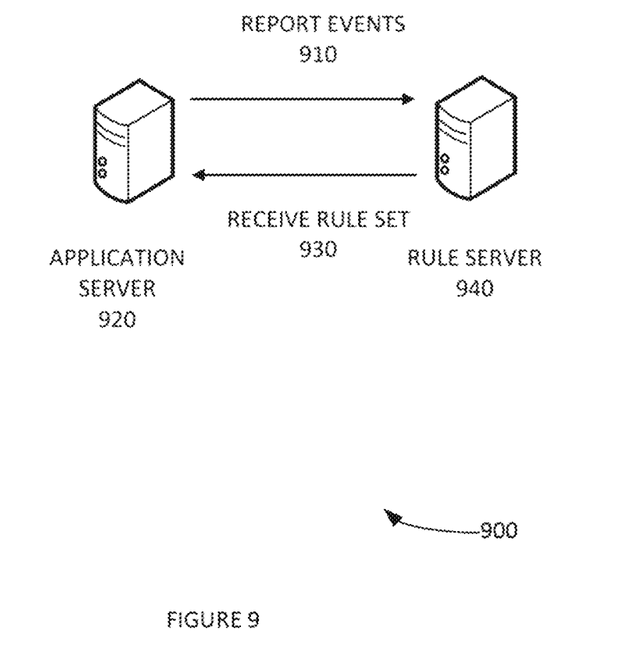
FIG. 9 illustrates an example rule-list update mechanism, according to some embodiments.

FIG. 9 illustrates an example rule-list update mechanism 900, according to some embodiments. The initial rule list provided to the application server 920 may be incomplete. An incomplete rule list can result in false positives, where valid API calls executed by a script file may be flagged as attacks. The mitigation of false positives is accomplished by transmitting events 910 generated at the application server 920 to the rule server 940. The rule server performs a detailed analysis of each received event to determine whether the event is a false positive or an actual attack. Either or both static and dynamic analysis can be performed to check the conformity of received events with the interpreted code in the script file. If an event is deemed valid, the rule list is updated to legitimize that API call. The updated rule set is sent 930 to the application server 920.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method useful for preventing exploitation of a vulnerability in an interpreted code by monitoring and validating an execution of the interpreted code in a script file by an application server, comprising:

generating a mapping for an incoming network connection to a specified script file to be executed by an application server;

inserting a hook for monitoring an application programming interface (API) call or a privileged instruction executed by the application server;

inserting a validation code configured to validate the API call or the privileged instruction executed by the interpreted code in a script, wherein the validation code matches the API call or the privileged instruction against a rule set for the script;

loading the rule set, wherein the rule set specifies a type of API call or a type of privileged instruction, and wherein the rule set specified a location of the API call or the privileged instruction in the interpreted code;

capturing an event, wherein the event indicates a start and an end of an execution of the interpreted code, wherein an application server thread manages the event;

obtaining an execution event of the API call or the privileged instruction that correspond to a specific script files by filtering the event collected from the application server;

checking, with a validation code, a conformity of the execution event of the API call or the privileged instruction with the rule set for the script as determined by the mapping;

detecting a rule violation; and obtaining, with the validation code, a default action for the execution event of the API call or the privileged instruction during the execution of the interpreted code.

2. The method of claim 1, wherein the interpreted code comprises a script executed by a web application server.

3. The method of claim 2, wherein an observed API call or an observed privileged instruction is reported to a rule server and a corresponding rule is received from the rule server.

4. The method of claim 3, wherein the observed API call or the observed privileged instruction location is validated against a known structure of the interpreted code.

5. The method of claim 4, wherein the observed API call location is validated by verifying an argument used during an analysis of a bytecode structure of the interpreted code.

6. The method of claim 5, wherein a rule list is downloaded from a rule server and used for validating the API call or the privileged instruction as executed by the interpreted code.

7. The method of claim 6, wherein a dynamic analysis is performed to determine the API call or the privileged instruction executed by the interpreted code, and wherein the dynamic analysis is used to create a rule.

8. The method of claim 7, wherein the validation code executes at a remote server location.

9. The method of claim 8, wherein an additional information about the system state is reported to the rule server.

* * * * *